United States Patent
Vierheilig et al.

(10) Patent No.: US 7,347,929 B2
(45) Date of Patent: Mar. 25, 2008

(54) GASOLINE SULFUR REDUCTION USING HYDROTALCITE LIKE COMPOUNDS

(75) Inventors: Albert A. Vierheilig, Savannah, GA (US); Bruce Keener, Rincon, GA (US)

(73) Assignee: Intercat, Inc., Manasquan, NJ (US)

( * ) Notice: Subject to any disclaimer, the term of this patent is extended or adjusted under 35 U.S.C. 154(b) by 349 days.

(21) Appl. No.: 10/749,695

(22) Filed: Dec. 31, 2003

(65) Prior Publication Data
US 2005/0121363 A1    Jun. 9, 2005

Related U.S. Application Data

(63) Continuation-in-part of application No. 10/729,270, filed on Dec. 5, 2003.

(51) Int. Cl.
*C10G 11/02*    (2006.01)
(52) U.S. Cl. ............... 208/113; 208/120.3; 208/120.35
(58) Field of Classification Search ............... 208/113, 208/120.3, 120.35
See application file for complete search history.

(56) References Cited

U.S. PATENT DOCUMENTS

| | | | |
|---|---|---|---|
| 3,679,763 A | 7/1972 | Livingston |
| 3,793,003 A | 2/1974 | Othmer |
| 3,857,921 A | 12/1974 | Tamura et al. |
| 3,869,500 A | 3/1975 | Kominami et al. |
| 3,894,164 A | 7/1975 | Dismukes et al. |
| 3,988,425 A | 10/1976 | Jockel et al. |
| 3,992,498 A | 11/1976 | Morton et al. |
| 4,010,233 A | 3/1977 | Winter et al. |
| 4,016,189 A | 4/1977 | Muller et al. |
| 4,048,244 A | 9/1977 | Hayes |
| 4,052,296 A | 10/1977 | Montagna |
| 4,071,436 A | 1/1978 | Blanton, Jr. et al. |
| 4,072,600 A | 2/1978 | Schwartz |
| 4,082,520 A | 4/1978 | Baron et al. |
| 4,093,535 A | 6/1978 | Schwartz |
| 4,097,353 A | 6/1978 | Kishida et al. |
| 4,131,496 A | 12/1978 | Weitzel et al. |
| 4,147,763 A | 4/1979 | McKinzie et al. |
| 4,153,535 A | 5/1979 | Vasalos et al. |
| 4,162,963 A | 7/1979 | Gorin |
| 4,173,454 A | 11/1979 | Heins |
| 4,192,855 A | 3/1980 | Ginger |
| 4,199,435 A | 4/1980 | Chessmore et al. |
| 4,238,317 A | 12/1980 | Vasalos et al. |
| 4,247,730 A | 1/1981 | Brunelle et al. |
| 4,254,558 A | 3/1981 | Mayer |
| 4,254,616 A | 3/1981 | Siminski et al. |
| 4,255,403 A | 3/1981 | Mayer et al. |
| 4,261,862 A | 4/1981 | Kinoshita et al. |
| 4,263,020 A | 4/1981 | Eberly, Jr. |
| 4,274,942 A | 6/1981 | Bartholic et al. |
| 4,274,981 A | 6/1981 | Suzuki et al. |
| 4,280,898 A | 7/1981 | Tatterson et al. |
| 4,282,084 A | 8/1981 | Gross et al. |
| 4,325,817 A | 4/1982 | Bartholic et al. |
| 4,358,297 A | 11/1982 | Eberly, Jr. |
| 4,374,819 A | 2/1983 | Palilla et al. |
| 4,376,103 A | 3/1983 | Bertolacini et al. |
| 4,381,993 A | 5/1983 | Nevitt |
| 4,422,888 A | 12/1983 | Stutius |
| 4,425,312 A | 1/1984 | Brignac |
| 4,432,864 A | 2/1984 | Myers et al. |
| 4,432,896 A | 2/1984 | Sugiyama et al. |
| 4,434,044 A | 2/1984 | Busch et al. |
| 4,452,854 A | 6/1984 | Merriam et al. |
| 4,465,588 A | 8/1984 | Occelli et al. |
| 4,465,779 A | 8/1984 | Occelli et al. |
| 4,469,588 A | 9/1984 | Hettinger, Jr. et al. |
| 4,469,589 A | 9/1984 | Yoo et al. |
| 4,472,267 A | 9/1984 | Yoo et al. |
| 4,481,103 A | 11/1984 | Krambeck et al. |
| 4,485,184 A | 11/1984 | Hettinger, Jr. et al. |
| 4,492,677 A | 1/1985 | Yoo et al. |
| 4,492,678 A | 1/1985 | Yoo et al. |
| 4,495,304 A | 1/1985 | Yoo et al. |
| 4,495,305 A | 1/1985 | Yoo et al. |

(Continued)

FOREIGN PATENT DOCUMENTS

CN    1275435    12/2000

(Continued)

OTHER PUBLICATIONS

Cavani et al., Catalysis Today, 11:173-301 (1991).

(Continued)

*Primary Examiner*—Glenn Caldarola
*Assistant Examiner*—Prem C. Singh
(74) *Attorney, Agent, or Firm*—Tanzina Chowdhury

(57) ABSTRACT

The present invention describes novel methods for reducing sulfur in gasoline with hydrotalcite like compound additives, calcined hydrotalcite like compounds, and/or mixed metal oxide solution. The additives can optionally further comprise one or more metallic oxidants and/or supports. The invention is also directed to methods for reducing gasoline sulfur comprising contacting a catalytic cracking feedstock with a mixed metal oxide compound comprising magnesium and aluminum and having an X-ray diffraction pattern displaying a reflection at least at a two theta peak position at about 43 degrees and about 62 degrees, wherein the ratio of magnesium to aluminum in the compound is from about 1:1 to about 10:1.

47 Claims, No Drawings

U.S. PATENT DOCUMENTS

| | | |
|---|---|---|
| 4,515,683 A | 5/1985 | Beck et al. |
| 4,519,897 A | 5/1985 | De Jong et al. |
| 4,520,120 A | 5/1985 | Mitchell et al. |
| 4,521,389 A | 6/1985 | Blanton, Jr. et al. |
| 4,522,937 A | 6/1985 | Yoo et al. |
| 4,549,958 A | 10/1985 | Beck et al. |
| 4,585,632 A | 4/1986 | Schneider et al. |
| 4,602,993 A | 7/1986 | Myers |
| 4,609,537 A | 9/1986 | Tolpin et al. |
| 4,609,539 A | 9/1986 | Horecky et al. |
| 4,613,428 A | 9/1986 | Edison |
| 4,617,175 A | 10/1986 | Tolpin et al. |
| 4,622,210 A | 11/1986 | Hirschberg et al. |
| 4,642,178 A | 2/1987 | Yoo et al. |
| 4,650,564 A | 3/1987 | Occelli et al. |
| 4,692,318 A | 9/1987 | Tolpin et al. |
| 4,708,785 A | 11/1987 | Myers |
| 4,708,786 A | 11/1987 | Occelli |
| 4,728,635 A | 3/1988 | Bhattacharyya et al. |
| 4,735,705 A | 4/1988 | Burk, Jr. et al. |
| 4,744,962 A | 5/1988 | Johnson et al. |
| 4,790,982 A | 12/1988 | Yoo et al. |
| 4,824,815 A | 4/1989 | Kugler |
| 4,836,993 A | 6/1989 | Bertolacini et al. |
| 4,866,019 A | 9/1989 | van Broekhoven et al. |
| 4,883,783 A | 11/1989 | Burk, Jr. et al. |
| 4,889,615 A | 12/1989 | Chin et al. |
| 4,904,627 A | 2/1990 | Bhattacharyya |
| 4,944,865 A | 7/1990 | Occelli et al. |
| 4,946,581 A | 8/1990 | van Broekhoven et al. |
| 4,952,382 A | 8/1990 | van Broekhoven et al. |
| 4,957,718 A | 9/1990 | Yoo et al. |
| 4,963,520 A | 10/1990 | Yoo et al. |
| 4,970,191 A | 11/1990 | Schutz |
| 4,973,399 A | 11/1990 | Green et al. |
| 5,037,538 A | 8/1991 | Chin et al. |
| 5,079,203 A | 1/1992 | Pinnavaia et al. |
| 5,114,898 A | 5/1992 | Pinnavaia et al. |
| 5,130,012 A | 7/1992 | Edwards et al. |
| 5,153,156 A | 10/1992 | Schutz et al. |
| 5,174,890 A | 12/1992 | Occelli |
| 5,229,091 A | 7/1993 | Buchanan et al. |
| 5,246,899 A | 9/1993 | Bhattacharyya |
| 5,250,279 A | 10/1993 | Preston et al. |
| 5,260,240 A | 11/1993 | Guthrie et al. |
| 5,262,203 A | 11/1993 | Lesher et al. |
| 5,270,272 A | 12/1993 | Galperin et al. |
| 5,288,675 A | 2/1994 | Kim |
| 5,292,492 A | 3/1994 | Buchanan et al. |
| 5,324,416 A | 6/1994 | Cormier et al. |
| 5,346,563 A | 9/1994 | Allen et al. |
| 5,364,517 A | 11/1994 | Dieckmann et al. |
| 5,371,055 A | 12/1994 | Cormier et al. |
| 5,380,442 A | 1/1995 | Yan |
| 5,384,301 A | 1/1995 | Flytzani-Stephanopoulos et al. |
| 5,399,327 A | 3/1995 | Kim |
| 5,399,329 A | 3/1995 | Schutz et al. |
| 5,407,878 A | 4/1995 | Kim |
| 5,422,332 A | 6/1995 | Demmel |
| 5,426,083 A | 6/1995 | Bhattacharyya et al. |
| 5,429,727 A | 7/1995 | Vogt et al. |
| 5,437,783 A | 8/1995 | Cuthbert et al. |
| 5,458,861 A | 10/1995 | Buchanan et al. |
| 5,459,259 A | 10/1995 | Pinnavaia et al. |
| 5,472,677 A | 12/1995 | Farris et al. |
| 5,492,684 A | 2/1996 | Buchanan et al. |
| 5,494,879 A | 2/1996 | Jin et al. |
| 5,503,814 A | 4/1996 | Demmel |
| 5,507,980 A | 4/1996 | Kelkar et al. |
| 5,514,351 A | 5/1996 | Buchanan et al. |
| 5,514,361 A | 5/1996 | Martin et al. |
| 5,518,704 A | 5/1996 | Kelkar et al. |
| 5,545,604 A | 8/1996 | Demmel |
| 5,547,548 A | 8/1996 | Siddoway |
| 5,547,648 A | 8/1996 | Buchanan et al. |
| 5,552,362 A | 9/1996 | Immel et al. |
| 5,559,067 A | 9/1996 | Lerner et al. |
| 5,565,181 A | 10/1996 | Dieckmann et al. |
| 5,567,224 A | 10/1996 | Kundrat |
| 5,578,286 A | 11/1996 | Martin et al. |
| 5,586,714 A | 12/1996 | Curicuta et al. |
| 5,591,417 A | 1/1997 | Buchanan et al. |
| 5,591,418 A | 1/1997 | Bhattacharyya et al. |
| 5,593,558 A | 1/1997 | Sugino et al. |
| 5,609,845 A | 3/1997 | Cimini et al. |
| 5,618,406 A | 4/1997 | Demmel |
| 5,627,123 A | 5/1997 | Kim |
| 5,652,060 A | 7/1997 | Uchida et al. |
| 5,687,565 A | 11/1997 | Modica et al. |
| 5,705,136 A | 1/1998 | Drago et al. |
| 5,723,039 A | 3/1998 | Zosimov et al. |
| 5,728,358 A | 3/1998 | Avidan et al. |
| 5,728,363 A | 3/1998 | Martin et al. |
| 5,728,364 A | 3/1998 | Martin et al. |
| 5,728,365 A | 3/1998 | Martin et al. |
| 5,728,366 A | 3/1998 | Martin et al. |
| 5,730,951 A | 3/1998 | Martin et al. |
| 5,741,469 A | 4/1998 | Bhore et al. |
| 5,750,020 A | 5/1998 | Bhattacharyya et al. |
| 5,753,198 A | 5/1998 | Ayala et al. |
| 5,762,892 A | 6/1998 | Kasahara et al. |
| 5,776,424 A | 7/1998 | Martin et al. |
| 5,792,338 A | 8/1998 | Gosling et al. |
| 5,792,436 A | 8/1998 | Feeley et al. |
| 5,805,973 A | 9/1998 | Coffinberry et al. |
| 5,814,291 A | 9/1998 | Kelkar |
| 5,843,862 A | 12/1998 | Bhattacharyya |
| 5,866,496 A | 2/1999 | Albers et al. |
| 5,874,019 A | 2/1999 | Uchida et al. |
| 5,882,616 A | 3/1999 | Ziebarth et al. |
| 5,882,622 A | 3/1999 | Easley et al. |
| 5,894,035 A | 4/1999 | Cinibulk et al. |
| 5,908,804 A | 6/1999 | Menon et al. |
| 5,914,288 A | 6/1999 | Turk et al. |
| 5,914,293 A | 6/1999 | Bhattacharyya et al. |
| 5,916,129 A | 6/1999 | Modica et al. |
| 5,928,496 A | 7/1999 | Albers et al. |
| 5,928,497 A | 7/1999 | Iaccino |
| 5,939,353 A | 8/1999 | Bhattacharyya et al. |
| 5,948,726 A | 9/1999 | Moskovitz et al. |
| 5,951,851 A | 9/1999 | Poirier et al. |
| 5,955,045 A | 9/1999 | Baur et al. |
| 5,958,359 A | 9/1999 | Buchanan et al. |
| 5,965,100 A | 10/1999 | Khanmamedov |
| 5,968,870 A | 10/1999 | Iizuka et al. |
| 5,972,828 A | 10/1999 | Doi et al. |
| 5,984,997 A | 11/1999 | Bickmore et al. |
| 5,990,030 A | 11/1999 | McCauley |
| 5,998,232 A | 12/1999 | Maruska |
| 6,001,241 A | 12/1999 | Gosling et al. |
| 6,027,636 A | 2/2000 | Poirier |
| 6,027,704 A | 2/2000 | Johnson et al. |
| 6,028,023 A | 2/2000 | Vierheilig |
| 6,030,597 A | 2/2000 | Buchanan et al. |
| 6,074,984 A | 6/2000 | Demmel et al. |
| 6,129,833 A | 10/2000 | McCauley |
| 6,129,834 A | 10/2000 | Peters et al. |
| 6,156,696 A | 12/2000 | Albers et al. |
| 6,171,991 B1 | 1/2001 | Stamires et al. |
| 6,180,764 B1 | 1/2001 | Noweck et al. |
| 6,200,445 B1 | 3/2001 | Yokota et al. |
| 6,274,530 B1 | 8/2001 | Cayton et al. |
| 6,281,164 B1 | 8/2001 | Demmel et al. |
| 6,306,793 B1 | 10/2001 | Turk et al. |

| | | |
|---|---|---|
| 6,333,290 B1 | 12/2001 | Stamires et al. |
| 6,338,830 B1 | 1/2002 | Moskovitz et al. |
| 6,338,831 B1 | 1/2002 | Strehlau et al. |
| 6,376,405 B1 | 4/2002 | Stamires et al. |
| 6,419,890 B1 | 7/2002 | Li |
| 6,440,887 B1 | 8/2002 | Stamires et al. |
| 6,468,488 B1 | 10/2002 | Stamires et al. |
| 6,479,421 B1 | 11/2002 | Vierheilig |
| 6,497,811 B1 * | 12/2002 | Myrstad et al. ............ 208/113 |
| 6,503,867 B1 | 1/2003 | Stamires et al. |
| 6,506,358 B1 | 1/2003 | Stamires et al. |
| 6,514,473 B2 | 2/2003 | Noweck et al. |
| 6,517,795 B1 | 2/2003 | Noweck et al. |
| 6,531,052 B1 | 3/2003 | Frye et al. |
| 6,541,409 B1 | 4/2003 | Jones et al. |
| 6,579,820 B2 | 6/2003 | Tamhankar et al. |
| 6,585,945 B2 | 7/2003 | Wu et al. |
| 6,589,902 B1 | 7/2003 | Stamires et al. |
| 6,593,265 B2 | 7/2003 | Stamires et al. |
| 6,610,264 B1 | 8/2003 | Buchanan et al. |
| 6,699,448 B2 | 3/2004 | Wu et al. |
| 6,716,338 B2 | 4/2004 | Madon et al. |
| 6,777,370 B2 | 8/2004 | Chen |
| 6,866,834 B2 | 3/2005 | Nakamura et al. |
| 6,914,033 B2 | 7/2005 | Gislason et al. |
| 6,923,945 B2 | 8/2005 | Chen |
| 6,929,736 B2 | 8/2005 | Vierheilig |
| 7,067,093 B2 | 6/2006 | Vierheilig et al. |
| 2003/0039597 A1 | 2/2003 | Deeba et al. |
| 2003/0089640 A1 | 5/2003 | Madon et al. |
| 2003/0096697 A1 | 5/2003 | Vierheilig |
| 2003/0203806 A1 | 10/2003 | Vierheilig |
| 2004/0031730 A1 | 2/2004 | Gislason et al. |
| 2004/0077492 A1 | 4/2004 | Yaluris et al. |
| 2004/0086442 A1 | 5/2004 | Vierheilig |
| 2004/0152586 A1 | 8/2004 | Ou et al. |
| 2005/0038306 A1 | 2/2005 | Beech et al. |
| 2005/0095188 A1 | 5/2005 | Matsumoto et al. |
| 2005/0207956 A1 | 9/2005 | Vierheilig |
| 2005/0227058 A1 | 10/2005 | Ohashi et al. |
| 2005/0234278 A1 | 10/2005 | van Egmond et al. |

FOREIGN PATENT DOCUMENTS

| | | |
|---|---|---|
| EP | 0045170 | 2/1982 |
| EP | 158858 | 10/1991 |
| EP | 0263171 | 11/1992 |
| EP | 0318808 | 2/1996 |
| EP | 0740580 | 10/1999 |
| EP | 1156012 | 11/2001 |
| EP | 0636107 | 2/2002 |
| EP | 1241329 | 9/2002 |
| WO | WO-95/03876 | 2/1995 |
| WO | WO-95/17265 | 6/1995 |
| WO | WO-99/26714 | 6/1999 |
| WO | WO-99/42201 A1 | 8/1999 |
| WO | WO-02/058819 | 8/2002 |
| WO | WO-03/018178 | 3/2003 |
| WO | WO-2005/060519 | 7/2005 |

OTHER PUBLICATIONS

Cavani et al., Hydrotalcite-Type Anionic Clays: Preparation, Properties and Applications. Catalysis Today, 11 (1991), pp. 173-301.

Corma et al., "Simultaneous Catalytic Removal of Sox and Nox with Hydrotalcite-derivated Mixed Oxides Contaning Copper, and their Possibilities to be Used in FCC Units," J. of Catalysts, vol. 170, pp. 140-149 (1997).

Shannon et al., "Hydrotatcite-derived mixed oxides containing copper: Catalysts for the removal of Nitric Oxide," J. Chem, Soc., Faraday Trans., vol. 92, pp. 4331-4336 (1996).

Taylor. "Crystal Structures of Some Double Hydroxide Minerals," Mineralogical Magazine, vol. 39, No. 304, pp. 377-389 (Dec. 1973).

* cited by examiner

GASOLINE SULFUR REDUCTION USING HYDROTALCITE LIKE COMPOUNDS

This is a continuation-in-part of application Ser. No. 10/729,270, filed Dec. 5, 2003, published as Publication No. 20050121362 on Jun. 5, 2005. The invention generally provides methods for gasoline sulfur reduction using hydrotalcite like compounds and using mixed metal oxide compounds.

FIELD OF THE INVENTION

This patent disclosure contains material which is subject to copyright protection. The copyright owner has no objection to the facsimile reproduction by anyone of the patent document or the patent disclosure, as it appears in the U.S. Patent and Trademark Office patent file or records, but otherwise reserves any and all copyright rights.

BACKGROUND OF THE INVENTION

Catalytic cracking is a petroleum refining process that is applied commercially on a very large scale. A majority of the refinery gasoline blending pool in the United States is produced by this process, with almost all being produced using the fluid catalytic cracking (FCC) process. In the catalytic cracking process heavy hydrocarbon fractions are converted into lighter products by reactions taking place at elevated temperature in the presence of a catalyst, with the majority of the conversion or cracking occurring in the vapor phase. The feedstock is thereby converted into gasoline, distillate and other liquid cracking products as well as lighter gaseous cracking products of four or less carbon atoms per molecule. The gas partly consists of olefins and partly of saturated hydrocarbons.

During the cracking reactions some heavy material, known as coke, is deposited onto the catalyst. This reduces the activity of the catalyst and regeneration is desired. After removal of occluded hydrocarbons from the spent cracking catalyst, regeneration is accomplished by burning off the coke to restore catalyst activity. The three characteristic steps of the catalytic cracking can be therefore be distinguished: a cracking step in which the hydrocarbons are converted into lighter products, a stripping step to remove hydrocarbons adsorbed on the catalyst and a regeneration step to burn off coke from the catalyst. The regenerated catalyst is then reused in the cracking step.

Catalytic cracking feedstocks normally contain sulfur in the form of organic sulfur compounds such as mercaptans, sulfides and thiophenes. The products of the cracking process correspondingly tend to contain sulfur impurities even though about half of the sulfur is converted to hydrogen sulfide during the cracking process, mainly by catalytic decomposition of non-thiophenic sulfur compounds. The distribution of sulfur in the cracking products is dependent on a number of factors including feed, catalyst type, additives present, conversion and other operating conditions but, in any event a certain proportion of the sulfur tends to enter the light or heavy gasoline fractions and passes over into the product pool. With increasing environmental regulation being applied to petroleum products, for example in the Reformulated Gasoline (RFG) regulations, the sulfur content of the products has generally been decreased in response to concerns about the emissions of sulfur oxides and other sulfur compounds into the air following combustion processes.

One approach has been to remove the sulfur from the FCC feed by hydrotreating before cracking is initiated. While highly effective, this approach tends to be expensive in terms of the capital cost of the equipment as well as operationally since hydrogen consumption is high. Another approach can involve post-treating the cracked products, such as gasoline, after the FCC process. While this may be effective, this approach has the drawback that valuable product octane may be lost when the high octane olefins are saturated. In yet another approach, an additive for sulfur reduction in the regenerator of an FCC unit can be used to reduce sulfur in gasoline without having to treat either the feed or cracked products.

Thus, there is a need in the art for new and improved methods to reduce the sulfur content in gasoline during the FCC process cycle. The invention is directed to this, as well as other, important ends.

SUMMARY OF THE INVENTION

The invention provides methods for reducing sulfur in gasoline by adding gasoline sulfur reduction additives comprising hydrotalcite like compounds to an FCC unit. The gasoline sulfur reduction additives can optionally further comprise one or more metallic oxidants and/or supports as described herein.

The invention provides methods for reducing sulfur in gasoline by adding gasoline sulfur reduction additives comprising calcined hydrotalcite like compounds to an FCC unit. The gasoline sulfur reduction additive can optionally further comprise one or more metallic oxidants and/or supports.

The invention also provides methods for reducing sulfur in gasoline by adding gasoline sulfur reduction additives comprising mixed metal oxide compounds, also referred to as precursors of hydrotalcite like compounds, to an FCC unit. The gasoline sulfur reduction additives can optionally further comprise one or more metallic oxidants and/or supports.

These and other aspects and advantages of the present invention are described in more detail below.

DETAILED DESCRIPTION OF THE INVENTION

The present invention relates to hydrotalcite like compounds, optionally comprising metallic oxidants and/or supports, having a superior ability to reduce sulfur in gasoline when added to an FCC unit. The gasoline sulfur reduction additive of the invention can comprise hydrotalcite like compounds and/or collapsed hydrotalcite like compounds made, for example, by the following process:

(a) reacting an aqueous mixture comprising at least one divalent metal compound and at least one trivalent metal compound to produce a mixed metal oxide compound in the form of an aqueous slurry;

(b) optionally heat treating the mixed metal oxide compound from step (a) at a temperature up to about 225° C.;

(c) drying the heat-treated compound from step (a) or step (b) to produce one or more shaped bodies suitable for use in the reduction of sulfur from gasoline;

(d) heat treating the shaped bodies from step (c) at a temperature of about 300° C. or higher to produce one or more calcined shaped bodies;

(e) hydrating the calcined shaped bodies from step (d) to produce a hydrotalcite like compound; and (f) optionally heating the hydrotalcite like compound to remove substantially all of the interstitial water and/or anions to produce a collapsed hydrotalcite like compound. Step (1) can optionally result in the product of hydrotalcite like compounds. Methods for making these hydrotalcite like compounds and collapsed hydrotalcite like compounds are described in U.S. Pat. Nos. 6,028,023 and 6,479,421, the disclosures of which are incorporated by reference herein in their entirety. Other methods for making hydrotalcite like compounds are described, for example, by Cavani et al, *Catalysis Today*, 11:173-301 (1991), the disclosure of which is incorporated by reference herein in its entirety.

In one embodiment, the invention provides a gasoline sulfur reduction additive comprising at least one hydrotalcite like compound. The hydrotalcite like compound can be used per se (i.e., without any additional materials) as the gasoline sulfur reduction additive. In addition, the at least one hydrotalcite like compound can include a support and/or at least one metallic oxidant. In another embodiment, the invention provides a gasoline sulfur reduction additive comprising at least one hydrotalcite like compound, at least one metallic oxidant, and at least one support.

Hydrotalcite like compounds are characterized by structures having positively charged layers that are separated by interstitial anions and/or water molecules. Exemplary natural minerals that are hydrotalcite like compounds include meixnerite, pyroaurite, sjogrenite, hydrotalcite, stichtite, reevesite, eardleyite, mannaseite, barbertonite and hydrocalumite. Other hydrotalcite like compounds are described by Cavani, supra. In one embodiment, the hydrotalcite like compound can be used per se as the gasoline sulfur reduction additive.

The gasoline sulfur reduction additives can comprise any support known in the art. Exemplary supports include spinels, magnesia, magnesium acetates, magnesium nitrates, magnesium chlorides, magnesium hydroxides, magnesium carbonates, magnesium formates, magnesium aluminates, hydrous magnesium silicates, magnesium silicates, magnesium calcium silicates, aluminum silicates, boria, calcium silicates, alumina, aluminum titanates, zinc titanates, aluminum zirconates, calcium oxides, calcium aluminates, aluminum nitrohydrates, aluminum hydroxide compounds (e.g., such as those described on page 9 in ACS Monograph 184, Industrial Alumina Chemicals, Misra, Chanakya, 1986, incorporated by reference herein in its entirety), aluminum-containing metal oxide compounds (e.g., other than alumina or aluminum hydroxide compounds), aluminum chlorohydrates, silicas, silicon-containing compounds other than silicas, silica/aluminas, alumina, titania, zirconia, clays (e.g., halloysite, rectorite, hectorite, montmorillinite, synthetic montmorillinite, sepiolite, activated sepeolite, kaolin, kieselguhr, celite, bastnasite), clay phosphate materials, zeolites (e.g., ZSM-5), and the like. The support can comprise one, two, three, four or more of the materials described above. In one embodiment, the support is a spinel, magnesium acetate, magnesium nitrate, magnesium chloride, magnesium hydroxide, magnesium carbonate, magnesium formate, magnesium aluminate, aluminum titanate, zinc titanate, aluminum zirconate, calcium oxide, calcium aluminate, aluminum nitrohydrate, aluminum hydroxide compound, aluminum-containing metal oxide compound (e.g., other than alumina or aluminum hydroxide compounds), aluminum chlorohydrate, titania, zirconia, or a mixture of two or more thereof.

The gasoline sulfur reduction additives can comprise one or more metallic oxidants known in the art. For example, the metal in the metallic oxidants can be antimony, bismuth, cadmium, cerium, chromium, cobalt, copper, dysoprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof. In another embodiment, the metal in the metallic oxidant is cerium, platinum, palladium, rhodium, iridium, molybdenum, tungsten, copper, chromium, nickel, manganese, cobalt, iron, ytterbium, uranium or a mixture of two or more thereof. In one embodiment, the metal in the metallic oxidant is cerium, cobalt, copper, platinum, tungsten, or a mixture of two or more thereof.

In another embodiment, the invention provides a gasoline sulfur reduction additive comprising at least one calcined hydrotalcite like compound and a support. Calcined hydrotalcite like compounds can be made by heating a hydrotalcite like compound until substantially all (or all) of the interstitial anions and/or water molecules are removed. The support can be any known in the art, such as those described above.

In another embodiment, the invention provides a gasoline sulfur reduction additive comprising at least one calcined hydrotalcite like compound and at least one metallic oxidant, where the metal in the metallic oxidant is antimony, bismuth, cadmium, cerium, chromium, copper, dysoprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, or a mixture of two or more thereof. In another embodiment, the metal in the metallic oxidant is cerium, vanadium, copper, platinum, tungsten, or a mixture of two or more thereof. In another embodiment, the metal in the metallic oxidant is cerium and/or vanadium. In another embodiment, the metal in the metallic oxidant is copper. In another embodiment, the metal in the metallic oxidant is platinum. In this embodiment of the invention, the gasoline sulfur reduction additive can further comprise a support, such as those described herein.

In another embodiment, the invention provides a gasoline sulfur reduction additive comprising at least one calcined hydrotalcite like compound and at least one metallic oxidant in an amount of at least 15% by weight, calculated as the oxide equivalent, where the metal in the metallic oxidant is antimony, bismuth, cadmium, cerium, chromium, cobalt, copper, dysoprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof. In one embodiment, the metal in the metallic oxidant is cerium, vanadium, cobalt, copper, platinum, tungsten, or a mixture of two or more thereof. In another embodiment, the metal in the metallic oxidant is cerium and/or vanadium. Alternatively, the gasoline sulfur reduction additive can comprise a calcined hydrotalcite like compound and one or more metallic oxidants in an amount of at least 20% by weight, 25% by weight, or 30% by weight, based on the oxide equivalent. In this embodiment of the invention, the gasoline sulfur reduction additive can further comprise a support, such as those described herein.

In another embodiment, the invention provides a gasoline sulfur reduction additive comprising at least one hydrotalcite like compound of formula (I) or formula (II):

$$(X^{2+}_m Y^{3+}_n (OH)_{2m+2n}) A_{n/a}^{a-} \cdot bH_2O \tag{I}$$

$$(Mg^{2+}_m Al^{3+}_n (OH)_{2m+2n}) A_{n/a}^{a-} \cdot bH_2O \tag{II}$$

where X is magnesium, calcium, zinc, manganese, cobalt, nickel, strontium, barium, copper or a mixture of two or more thereof; Y is aluminum, manganese, iron, cobalt, nickel, chromium, gallium, boron, lanthanum, cerium or a mixture of two or more thereof; A is $CO_3$, $NO_3$, $SO_4$, Cl, OH, Cr, I, $SiO_3$, $HPO_3$, $MnO_4$, $HGaO_3$, $HVO_4$, $ClO_4$ $BO_3$ or a mixture of two or more thereof; a is 1, 2 or 3; b is between 0 and 10; and m and n are selected so that the ratio of m/n is about 1 to about 10. The hydrotalcite like compound of formula (II) can be hydrotalcite (i.e., $Mg_6Al_2(OH)_{16}$ $CO_3 \cdot 4H_2O$). Methods for making these hydrotalcite like compounds are described above and in U.S. Pat. Nos. 6,028,023 and 6,479,421, the disclosures of which are incorporated by reference herein in their entirety. In one embodiment, the hydrotalcite like compound of formula (I) or formula (II) can be used per se as the gasoline sulfur reduction additive.

In another embodiment, the invention provides a gasoline sulfur reduction additive comprising at least one hydrotalcite like compound of formula (I) or formula (II) and a support, wherein the support is as described herein. In one embodiment, the support is a spinel, magnesium acetate, magnesium nitrate, magnesium chloride, magnesium hydroxide, magnesium carbonate, magnesium formate, magnesium aluminate, aluminum titanate, zinc titanate, aluminum zirconate, calcium oxide, calcium aluminate, aluminum nitrohydrate, aluminum hydroxide compound, aluminum-containing metal oxide compound (e.g., other than alumina or aluminum hydroxide compounds), aluminum chlorohydrate, titania, zirconia, clay (e.g., halloysite, rectorite, hectorite, montmorillinite, synthetic montmorillinite, sepiolite, activated sepeolite, kaolin), clay phosphate material, zeolite, or a mixture of two or more thereof. In this embodiment of the invention, the gasoline sulfur reduction additive can optionally further comprise one or more metallic oxidants.

In another embodiment, the invention provides a gasoline sulfur reduction additive comprising a hydrotalcite like compound of formula (I) or formula (II) and one or more metallic oxidants. The metal in the metallic oxidants can be antimony, bismuth, cadmium, cerium, chromium, cobalt, copper, dysoprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof. In another embodiment, the metal in the metallic oxidant is cerium, vanadium, platinum, palladium, rhodium, iridium, molybdenum, tungsten, copper, chromium, nickel, manganese, cobalt, iron, ytterbium, uranium or a mixture of two or more thereof. In one embodiment, the metal in the metallic oxidant is cerium, cobalt, copper, platinum, tungsten, or a mixture of two or more thereof. In this embodiment of the invention, the gasoline sulfur reduction additive can optionally further comprise a support.

In another embodiment, the invention provides a gasoline sulfur reduction additive comprising a hydrotalcite like compound of formula (III) or formula (IV):

$$(X^{2+}_m Y^{3+}_n (OH)_{2m+2n}) OH_n^- \cdot bH_2O \tag{III}$$

$$(Mg^{2+}_m Al^{3+}_n (OH)_{2m+2n}) OH_n^- \cdot bH_2O \tag{IV}$$

wherein X is magnesium, calcium, zinc, manganese, cobalt, nickel, strontium, barium, copper or a mixture of two or more thereof; Y is aluminum, manganese, iron, cobalt, nickel, chromium, gallium, boron, lanthanum, cerium or a mixture of two or more thereof; b is between 0 and 10; and m and n are selected so that the ratio of n/n is about 1 to about 10. In one embodiment, the compound of formula (IV) is $Mg_6Al_2(OH)_{18} \cdot 4.5H_2O$. The hydrotalcite like compounds of formula (III) or formula (IV) can contain minor amounts of anionic (e.g., $CO_3$) impurities. Methods for making these hydrotalcite like compounds are described in U.S. Pat. Nos. 6,028,023 and 6,479,421, the disclosures of which are incorporated by reference herein in their entirety. In one embodiment, the hydrotalcite like compound of formula (III) or formula (IV) can be used per se as the gasoline sulfur reduction additive.

In another embodiment, the invention provides a gasoline sulfur reduction additive comprising a hydrotalcite like compound of formula (III) or formula (IV) and a support, such as those described herein.

In another embodiment, the invention provides a gasoline sulfur reduction additive comprising a hydrotalcite like compound of formula (III) or formula (IV) and one or more metallic oxidants. The metal in the metallic oxidants can be antimony, bismuth, cadmium, cerium, chromium, cobalt, copper, dysoprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof. In another embodiment, the metal in the metallic oxidant is cerium, vanadium, platinum, palladium, rhodium, iridium, molybdenum, tungsten, copper, chromium, nickel, manganese, cobalt, iron, ytterbium, uranium or a mixture of two or more thereof. In one embodiment, the metal in the metallic oxidant is cerium, vanadium, cobalt, copper, platinum, tungsten, or a mixture of two or more thereof. In this embodiment of the invention, the gasoline sulfur reduction additive can optionally further comprise a support.

In another embodiment, the invention provides a gasoline sulfur reduction additive comprising a hydrotalcite like compound having an XRD pattern which has a 2 theta peak position that reasonably resembles, or is nearly identical to, that found in ICDD card 35-965; ICDD Card No. 22-0700; ICDD Card No. 35-1275; or ICDD Card No. 35-0964. In one embodiment, the hydrotalcite like compound has an XRD pattern which has a 2 theta peak position that reasonably resembles, or is nearly identical to, that found in ICDD card 35-965. Methods for making these hydrotalcite like compounds are described above and in U.S. Pat. Nos. 6,028,023 and 6,479,421, the disclosures of which are incorporated by reference herein in their entirety. In one embodiment, the hydrotalcite like compound having an XRD pattern which has a 2 theta peak position that reasonably resembles, or is nearly identical to, that found in ICDD card 35-965; ICDD Card No. 22-0700; ICDD Card No.

35-1275; or ICDD Card No. 35-0964, can be used per se as the gasoline sulfur reduction additive.

In another embodiment, the invention provides a gasoline sulfur reduction additive comprising a hydrotalcite like compound having an XRD pattern which has a 2 theta peak position that reasonably resembles, or is nearly identical to, that found in ICDD card 35-965; ICDD Card No. 22-0700; ICDD Card No. 35-1275; or ICDD Card No. 35-0964, and a support, such as those described herein. In this embodiment, the gasoline sulfur reduction additive can optionally further comprise one or more metallic oxidants.

In another embodiment, the invention provides a gasoline sulfur reduction additive comprising a hydrotalcite like compound having an XRD pattern which has a 2 theta peak position that reasonably resembles, or is nearly identical to, that found in ICDD card 35-965; ICDD Card No. 22-0700; ICDD Card No. 35-1275; or ICDD Card No. 35-0964; and at least one metallic oxidant. The metal in the metallic oxidant can be antimony, bismuth, cadmium, cerium, chromium, cobalt, copper, dysoprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof. In another embodiment, the metal in the metallic oxidant is cerium, vanadium, platinum, palladium, rhodium, iridium, molybdenum, tungsten, copper, chromium, nickel, manganese, cobalt, iron, ytterbium, uranium or a mixture of two or more thereof. In one embodiment, the metal in the metallic oxidant is cerium, vanadium, cobalt, copper, platinum, tungsten, or a mixture of two or more thereof. In this embodiment of the invention, the gasoline sulfur reduction additive can optionally further comprise a support.

In another embodiment, the invention provides a gasoline sulfur reduction additive comprising at least one hydrotalcite like compound having an XRD pattern displaying at least a reflection at a 2 theta peak position of about 11 degrees, about 23 degrees and about 34 degrees. Methods for making these hydrotalcite like compounds and collapsed hydrotalcite like compounds are described above and in U.S. Pat. Nos. 6,028,023 and 6,479,421, the disclosures of which are incorporated by reference herein in their entirety. In one embodiment, the hydrotalcite like compound having an XRD pattern displaying at least a reflection at a 2 theta peak position of about 11 degrees, about 23 degrees and about 34 degrees can be used per se as the gasoline sulfur reduction additive. In this embodiment of the invention, the gasoline sulfur reduction additive can optionally further comprise a support and/or one more metallic oxidants.

In another embodiment, the invention provides a gasoline sulfur reduction additive comprising at least one hydrotalcite like compound having an XRD pattern displaying at least a reflection at a 2 theta peak position of about 11 degrees, about 23 degrees and about 34 degrees, and at least one metallic oxidant. The metal in the metallic oxidant can be antimony, bismuth, cadmium, cerium, chromium, cobalt, copper, dysoprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof. In another embodiment, the metal in the metallic oxidant is cerium, vanadium, platinum, palladium, rhodium, iridium, molybdenum, tungsten, copper, chromium, nickel, manganese, cobalt, iron, ytterbium, uranium or a mixture of two or more thereof. In one embodiment, the metal in the metallic oxidant is cerium, vanadium, cobalt, copper, platinum, tungsten, or a mixture of two or more thereof. In this embodiment of the invention, the gasoline sulfur reduction additive optionally further comprises a support.

In another embodiment, the invention provides a gasoline sulfur reduction additive comprising a hydrotalcite-like compound comprising a magnesium-containing compound and an aluminum-containing compound, wherein the molar ratio of Mg:Al is from 1:1 to 10:1; from 1:1 to 6:1, or from 1.5:1 to 6:1, or from 2:1 to 5:1. The hydrotalcite like compound has an X-ray diffraction pattern displaying at least a reflection at a two theta peak position between 8 and 15 degrees. Methods for making this hydrotalcite like compound are described in U.S. Pat. Nos. 6,028,023 and 6,479,421, the disclosures of which are incorporated by reference herein in their entirety. In one embodiment, the hydrotalcite like compound can be used per se as the gasoline sulfur reduction additive. In this embodiment of the invention, the gasoline sulfur reduction additive can optionally further comprise a support, such as those described herein, and/or one or more metallic oxidants, such as those described herein.

In other embodiments, the invention provides gasoline sulfur reduction additives comprising mixed metal oxide compounds, also referred to as precursors of hydrotalcite like compounds herein, produced, for example, by the following process:

(a) reacting an aqueous mixture comprising at least one divalent metal compound and at least one trivalent metal compound to produce a mixed metal oxide compound in the form of an aqueous slurry;

(b) optionally heat treating the mixed metal oxide compound from step (a) at a temperature up to about 225° C. to produce a heat-treated mixed metal oxide compound in the form of an aqueous slurry;

(c) drying the heat-treated compound from step (b) to produce one or more shaped bodies of the mixed metal oxide compound; and, optionally, (d) heat treating the compound from step (c) at a temperature of about 300° C. or higher to produce one or more calcined shaped bodies of a mixed metal oxide compound. In some embodiments, the heating of step (d) is optional. In other embodiments of the invention, step (a) can result in the production of minor amounts (e.g., 15% or less; 10% or less; 5% or less; 1% or less) of hydrotalcite like compounds. In other embodiments, step (a) produces substantially no hydrotalcite like compounds. Methods for making these mixed metal oxide compounds are described in U.S. Pat. Nos. 6,028,023 and 6,479,421, the disclosures of which are incorporated by reference herein in their entireties. The mixed metal oxide compounds of this invention, also referred to as precursors of hydrotalcite like compounds, do not derive predominantly from hydrotalcite like compounds.

Steps (a)-(d) can be conducted in a continuous and/or batch wise manner. The terms "aqueous slurry" and "slurry" include, for example, sol solutions, gels and pastes. In the methods of making the shaped bodies of the mixed metal oxide compounds of the invention, a solvent can optionally be added to the slurry during the heat treatment of step (b). The solvent can be, for example, acetic acid, propionic acid, formic acid, butyric acid, valeric acid, nitric acid, ammonium hydroxide, water, and the like. In one embodiment, the solvent is acetic acid.

In the above method, prior to step (a), the divalent metal compound can be prepared in the form of a slurry, and the trivalent metal compound can be prepared in the form of a slurry. The divalent metal compound and the trivalent metal compound can be separately prepared in the form of a slurry, and then mixed together; or a mixture containing the divalent metal compound and the trivalent metal compound can be prepared by simultaneously or concurrently mixing the compounds together in the form of a slurry.

In one embodiment, the aqueous mixture in step (a) of the method of preparing mixed metal oxide compounds can further comprise one or more other metal components such as metals of antimony, bismuth, cadmium, cerium, chromium, cobalt, copper, dysoprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof. The metals can be in an elemental state and/or can be in the form of metal oxides, metal sulfides, metal halides, or mixtures of two or more thereof. In one embodiment, the aqueous reaction mixture further comprises copper (e.g., CuO), cobalt (e.g., CoO), vanadium (e.g., $V_2O_5$), titanium ($TiO_2$), lanthanum ($La_2O_3$), cerium (e.g., $CeO_2$), tungsten, or a mixture of two or more thereof. In another embodiment, the aqueous reaction mixture further comprises copper (e.g., CuO), cobalt (CoO), vanadium (e.g., $V_2O_5$), cerium (e.g., $CeO_2$), or a mixture of two or more thereof. The one or more metal components (or oxide, sulfides, and/or halides thereof) can be present in the aqueous reaction mixture in an amount up to about 40% by weight; or from about 1% to about 25% by weight; or from about 2% to about 20% by weight, calculated as the oxide equivalent. The one or more other metal components can be added to the aqueous reaction mixture at the same time as the at least one divalent metal compound and the at least one trivalent metal compound are being mixed together to form the aqueous slurry.

Step (b) of heat treating the aqueous slurry in the above method can be conducted by heat treating the aqueous slurry at a temperature of about 50° C. to less than 225° C.; at a temperature of about 60° C. to about 200° C.; at a temperature of about 70° C. to about 150° C.; at a temperature of about 75° C. to about 100° C.; or at a temperature of about 80° C. to about 85° C. The low temperature heat treating step can be conducted for about 10 minutes to about 24 hours or more. The low temperature heat treatment is generally conducted in air or an inert atmosphere, and at atmospheric pressures. In one embodiment, the step of low temperature heat treatment is accomplished using steam injection, jacketing, heat coils, and/or autoclave. The low temperature heat treatment does not result in a dry compound, but instead is in the form of a heat-treated, aqueous slurry.

In another embodiment, the one or more other metal components (e.g., metals, oxides, sulfides and/or halides of antimony, bismuth, cadmium, cerium, chromium, cobalt, copper, dysoprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof) can be added to the aqueous slurry before, during and/or after step (b) of the above method of mixed metal oxide compound production.

After conducting the low temperature heat treatment, the heat-treated, aqueous slurry is dried. The drying step can be accomplished by, for example, spray drying, drum drying, flash drying, tunnel drying, and the like. In one embodiment, the drying step is accomplished by spray drying. Upon drying, the mixed metal oxide compounds can be in the form of shaped bodies (e.g., particles, grains, pellets, powders, extrudate, spheres, granules, and mixtures of two or more thereof). The drying step can optionally be used to create shaped bodies having particular shapes of interest. The dried mixed metal oxide compounds described herein can be used in an FCC unit to reduce sulfur from gasoline.

Step (d) of the method of producing mixed metal oxides can also be conducted at a temperature from about 300° C. to about 1,600° C.; or about 300° C. to about 850° C.; or about 400° C. to about 500° C. In other embodiments, step (d) is conducted at a temperature from about 300° C. to about 850° C.; or about 500° C. to about 850° C.; or about 550° C. to about 850° C.; or about 600° C. to about 850° C. The high temperature heat treatment is generally conducted in air at atmospheric pressures. The high temperature heat treatment step can be conducted for about 10 minutes to about 24 hours or more; from about 1 hour to about 18 hours; or from about 1 hour to about 10 hours. The high temperature heat treatment step can be conducted in air, in an inert environment, in an oxidizing environment (e.g., higher amounts of oxygen than that found in "normal" air), or in a reducing environment. In one embodiment, the high temperature heat treatment step is conducted in air. The calcined mixed metal oxide compounds described herein can be used in an FCC unit to reduce sulfur in gasoline.

The dried and/or calcined shaped bodies comprising mixed metal oxide compounds generally have an attrition less than 4; less than 3; less than 2.5, less than 2.4, less than 2.3, less than 2.2, or less than 2.1; preferably less than 2; less than 1.9; less than 1.8; less than 1.7, less than 1.6 or less than 1.5. In other embodiments, the attrition of the mixed metal oxide can be less than 1.4; less than 1.3; less than 1.2; less than 1.1; less than 1.0; less than 0.9; less than 0.8; or less than 0.7. The attrition of the mixed metal oxide compounds is measured by the ASTM D5757 method between the first and second hours or between the first and fifth hours.

In one embodiment, the mixed metal oxide is a solid solution magnesium aluminate comprising magnesium and aluminum in a ratio of about 1.1 to about 6:1, wherein the calcined form of the solid solution magnesium aluminate has an X-ray diffraction pattern displaying at least a reflection at a two theta peak position at about 43 degrees and about 62 degrees. In other embodiments, the ratio of magnesium to aluminum is 1:1 to 6:1; 1.1:1 to 6:1; 1.2:1 to 5:1; 1.3:1 to 5:1; 1.4:1 to 5:1; 1.5:1 to 5:1; 1.6:1 to 5:1; 1.7:1 to 5:1; 1.8:1 to 5:1; 1.9:1 to 5:1; or 2:1 to 5:1. The composition, as a whole, can comprise magnesium in an amount of at least 38% by weight calculated as the oxide equivalent (i.e., MgO). Alternatively, the composition, as a whole, can comprise magnesium in an amount of at least 39% by weight, 40% by weight, 41% by weight, 42% by weight, 43% by weight, 44% by weight, 45% by weight, or 50% by weight, calculated as the oxide equivalent (i.e., MgO). The solid solution can be in the form of a slurry, dried shaped bodies and/or calcined shaped bodies. The solid solution can be used in the methods described herein by itself or the solid solution can be used in a composition that contains other components (e.g., metallic oxidants and/or supports).

The shaped bodies can comprise the solid solution magnesium aluminate, one or more metallic oxidants, and, optionally, a support; where the metal in the metallic oxidant is antimony, bismuth, cadmium, cerium, chromium, cobalt, copper, dysoprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof. In one embodiment, the composition comprises copper (e.g., CuO), cobalt (e.g., CoO), vanadium (e.g., $V_2O_5$), titanium ($TiO_2$), lanthanum ($La_2O_3$), cerium (e.g., $CeO_2$), tungsten, or a mixture of two or more thereof. In another embodiment, the composition comprises copper (e.g., CuO), cobalt (CoO), vanadium (e.g., $V_2O_5$), cerium (e.g., $CeO_2$), or a mixture of two or more thereof. In another embodiment, the composition comprises copper (e.g., CuO) and/or cobalt (CoO). In another embodiment, the composition comprises vanadium (e.g., $V_2O_5$) and/or cerium (e.g., $CeO_2$). The support can be a spinel and/or a hydrotalcite like compound.

The divalent metal cation in the divalent metal compound can be, for example, $Mg^{2+}$, $Ca^{2+}$, $Zn^{2+}$, $Mn^{2+}$, $Co^{2+}$, $Ni^{2+}$, $Sr^{2+}$, $Ba^{2+}$, $Cu^{2+}$ or a mixture of two or more thereof. In one embodiment, the divalent metal cation is $Mg^{2+}$. Divalent metal compounds are well known in the art. Exemplary divalent metal compounds containing Mg include magnesium oxide, magnesium hydroxy acetate, magnesium acetate, magnesium hydroxide, magnesium nitrate, magnesium hydroxide, magnesium carbonate, magnesium formate, magnesium chloride, magnesium aluminate, hydrous magnesium silicate, magnesium calcium silicate, and mixtures of two or more thereof.

The trivalent metal cation in the trivalent metal compound can be, for example, $Al^{3+}$, $Mn^{3+}$, $Fe^{3+}$, $Co^{3+}$, $Ni^{3+}$, $Cr^{3+}$, $Ga^{3+}$, $B^{3+}$, $La^{3+}$, $Gl^{3+}$ or a mixture of two or more thereof. In one embodiment, the trivalent metal cation is $Al^{3+}$. Trivalent metal compounds are well known in the art. Exemplary trivalent metal compounds containing $Al^{3+}$ include aluminum hydroxide hydrate, aluminum oxide, aluminum acetate, aluminum nitrate, aluminum hydroxide, aluminum carbonate, aluminum formate, aluminum chloride, hydrous aluminum silicate, aluminum calcium silicate, and mixtures of two or more thereof.

In the mixed metal oxide compounds of the invention, the ratio of the divalent metal cation (e.g., $Mg^{2+}$) to the trivalent metal cation (e.g., $Al^{3+}$) can be from about 1:1 to about 10:1; from about 1.1:1 to about 6:1; about 1.2:1 to about 5:1; about 1.3:1 to about 5:1; about 1.4:1 to about 5:1; about 1.5:1 to about 5:1; about 1.6:1 to about 5:1; about 1.7:1 to about 5:1; about 1.8:1 to about 5:1; about 1.9:1 to about 5:1; or about 2:1 to about 5:1. In certain embodiments, the ratio can be from about 1:1 to about 10:1; from about 1:1 to about 6:1; from about 1.5:1 to about 6:1; or from about 2:1 to about 5:1.

In one embodiment, the invention provides a gasoline reduction additive comprising a mixed metal oxide solid solution, where the ratio of the divalent metal cation (e.g., Mg, Ca, Zn, Mn, Co, Ni, Sr, Ba, Cu or a mixture of two or more thereof) to the trivalent metal cation (e.g., Al, Mn, Fe, Co, Ni, Cr, Ga, B, La, Ce or a mixture of two or more thereof) is from about 1:1 to about 10:1; from about 1:1 to about 6:1; from about 1.5:1 to about 6:1; or from about 2:1 to about 5:1. In one embodiment, the mixed metal oxide solid solution of the invention is not derived from a hydrotalcite like compound. In another embodiment, the mixed metal oxide solid solution can be used per se as the gasoline sulfur reduction additive. In this embodiment of the invention, the gasoline sulfur reduction additive can optionally further comprise a support, such as those described herein, and/or one or more metallic oxidants, such as those described herein.

In another embodiment, the invention provides a gasoline reduction additive comprising a magnesium aluminate solid solution comprising magnesium and aluminum in a ratio of about 1.1 to about 10:1 and having an X-ray diffraction pattern displaying at least a reflection at a two theta peak position at about 43 degrees and about 62 degrees. In other embodiments, the ratio of magnesium to aluminum is 1:1 to 6:1; 1.1 to 6:1; 1.5:1 to 5:1; or 2:1 to 5:1; or 2:1 to 4:1. The solid solution can be in the form of a slurry, dried shaped bodies and/or calcined shaped bodies. In one embodiment, the magnesium aluminate solid solution of the invention is not derived from a hydrotalcite like compound. In another embodiment, the magnesium aluminate solid solution can be used per se as the gasoline sulfur reduction additive.

In another embodiment, the invention provides a gasoline sulfur reduction additive comprising a support and a magnesium aluminate solid solution comprising magnesium and aluminum in a ratio of about 1.1 to about 10:1 and having an X-ray diffraction pattern displaying at least a reflection at a two theta peak position at about 43 degrees and about 62 degrees. In other embodiments, the ratio of magnesium to aluminum is 1:1 to 6:1; 1.1 to 6:1; 1.5:1 to 5:1; or 2:1 to 5:1. The solid solution can be in the form of a slurry, dried shaped bodies and/or calcined shaped bodies. In one embodiment, the magnesium aluminate compound of the invention is not derived from a hydrotalcite like compound. The support can be, for example, spinels, magnesia, magnesium acetates, magnesium nitrates, magnesium chlorides, magnesium hydroxides, magnesium carbonates, magnesium formates, magnesium aluminates, hydrous magnesium silicates, magnesium silicates, magnesium calcium silicates, aluminum silicates, boria, calcium silicates, alumina, aluminum titanates, zinc titanates, aluminum zirconates, calcium oxides, calcium aluminates, aluminum nitrohydrates, aluminum hydroxide compounds, aluminum-containing metal oxide compounds (e.g., other than alumina or aluminum hydroxide compounds), aluminum chlorohydrates, silicas, silicon-containing compounds other than silicas, silica/aluminas, alumina, titania, zirconia, clays (e.g., halloysite, rectorite, hectorite, montmorillinite, synthetic montmorillinite, sepiolite, activated sepeolite, kaolin, kieselguhr, celite, bastnasite), clay phosphate materials, zeolites (e.g., ZSM-5), and the like. In this embodiment, the gasoline sulfur reduction additive can optionally further comprise one or more metallic oxidants.

In another embodiment, the invention provides a gasoline sulfur reduction additive comprising at least one metallic oxidant and a magnesium aluminate solid solution comprising magnesium and aluminum in a ratio of about 1:1 to about 10:1 and having an X-ray diffraction pattern displaying at least a reflection at a two theta peak position at about 43 degrees and about 62 degrees. In other embodiments, the ratio of magnesium to aluminum is 1:1 to 6:1; 1.1 to 6:1; 1.5:1 to 5:1; or 2:1 to 5:1. The solid solution can be in the form of a slurry, dried shaped bodies and/or calcined shaped bodies. In one embodiment, the magnesium aluminate compound of the invention is not derived from a hydrotalcite like compound. The metal in the metallic oxidant can be antimony, bismuth, cadmium, cerium, chromium, cobalt, copper, dysoprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof. In another embodiment, the metal in the metallic oxidant is cerium, vanadium, platinum, palladium, rhodium, iridium, molybdenum, tungsten, copper, chromium, nickel, manganese, cobalt, iron, ytterbium, uranium or a mixture of two or more thereof. In one embodiment, the metal in the metallic oxidant is cerium, vanadium, cobalt, copper, platinum, tungsten, or a mixture of two or more thereof. In this embodiment of the invention, the gasoline sulfur reduction additive optionally further comprises a support.

In another embodiment, the invention provides methods for reducing gasoline sulfur by contacting a mixed metal oxide compound with a catalytic cracking feedstock. The mixed metal oxide compound can be a magnesium aluminate compound or can be in the form of a solid solution. The mixed metal oxide compounds can be in the form of shaped bodies, which can be dried, calcined or a mixture thereof.

In another embodiment, the invention provides methods for reducing gasoline sulfur by adding one or more shaped bodies comprising mixed metal oxide compounds and one or more metallic oxidants to the catalytic cracking feedstock. The mixed metal oxide compound can be a magnesium aluminate compound or can be in the form of a solid solution. The mixed metal oxide compounds can be in the form of shaped bodies, which can be dried, calcined or a mixture thereof. The metal in the metallic oxidant is antimony, bismuth, cadmium, cerium, chromium, cobalt, copper, dysoprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof. In one embodiment, the shaped bodies are dried, calcined or a mixture thereof.

In another embodiment, the invention provides methods for reducing gasoline sulfur by adding one or more shaped bodies comprising mixed metal oxide compounds and a support to the catalytic cracking feedstock. The mixed metal oxide compound can be a magnesium aluminate compound or can be in the form of a solid solution. In addition, the shaped bodies can be dried, calcined or a mixture thereof. In this embodiment, the support can be a spinel, a hydrotalcite like compound, magnesium acetate, magnesium nitrate, magnesium chloride, magnesium hydroxide, magnesium carbonate, magnesium formate, aluminum titanate, zinc titanate, zinc aluminate, zinc titanate/zinc aluminate, aluminum zirconate, calcium oxide, calcium aluminate, aluminum nitrohydrate, aluminum hydroxide compound, aluminum-containing metal oxide compound (e.g., other than alumina or aluminum hydroxide compounds), aluminum chlorohydrate, titania, zirconia, clay (e.g., halloysite, rectorite, hectorite, montmorillinite, synthetic montmorillinite, sepiolite, activated sepiolite, kaolin), clay phosphate material, zeolite, or a mixture of two or more thereof. In one embodiment, the shaped bodies can are dried, calcined or a mixture thereof.

In another embodiment, the invention provides methods for reducing gasoline sulfur by adding one or more shaped bodies comprising mixed metal oxide compounds; one or more metallic oxidants; and a support to the catalytic cracking feedstock. The mixed metal oxide compound can be a magnesium aluminate compound or can be in the form of a solid solution. In addition, the shaped bodies can be dried, calcined or a mixture thereof.

In another embodiment, the invention provides methods for reducing gasoline sulfur by adding one or more shaped bodies comprising about 99 wt % to about 1 wt % mixed metal oxide compounds and about 1 wt % to about 99 wt % hydrotalcite like compounds to the catalytic cracking feedstock. The mixed metal oxide compound can be a magnesium aluminate compound or can be in the form of a solid solution. In addition, the shaped bodies can be dried, calcined or a mixture thereof.

In another embodiment, the invention provides methods for reducing gasoline sulfur by adding one or more shaped bodies comprising (i) about 99 wt % to about 1 wt % mixed metal oxide compounds, (ii) about 1 wt % to about 99 wt % hydrotalcite like compounds, and (iii) one or more metallic oxidants to the catalytic cracking feedstock. The mixed metal oxide compound can be a magnesium aluminate compound or can be in the form of a solid solution. In one embodiment, the mixed metal oxide is a precursor to a hydrotalcite like compound. In addition, the shaped bodies can be dried, calcined or a mixture thereof. The metal in the metallic oxidant can be antimony, bismuth, cadmium, cerium, chromium, cobalt, copper, dysoprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof.

In another embodiment, the invention provides methods for reducing gasoline sulfur by adding one or more shaped bodies comprising (i) about 99 wt % to about 1 wt % mixed metal oxide compounds, (ii) about 1 wt % to about 99 wt % hydrotalcite like compounds, and (iii) a support oxidants to the catalytic cracking feedstock. The mixed metal oxide compound can be a magnesium aluminate compound or can be in the form of a solid solution. In one embodiment, the mixed metal oxide is a precursor to a hydrotalcite like compound. In addition, the shaped bodies can be dried, calcined or a mixture thereof. The support can be a spinel, hydrotalcite like compound, magnesium acetate, magnesium nitrate, magnesium chloride, magnesium hydroxide, magnesium carbonate, magnesium formate, aluminum titanate, zinc titanate, zinc aluminate, zinc titanate/zinc aluminate, aluminum zirconate, calcium oxide, calcium aluminate, aluminum nitrohydrate, aluminum hydroxide compound, aluminum-containing metal oxide compound (e.g., other than alumina or aluminum hydroxide compounds), aluminum chlorohydrate, titania, zirconia, clay (e.g., halloysite, rectorite, hectorite, montmorillinite, synthetic montmorillinite, sepiolite, activated sepiolite, kaolin), clay phosphate material, zeolite, or a mixture of two or more thereof.

In another embodiment, the invention provides methods for reducing gasoline sulfur by adding one or more shaped bodies comprising (i) about 99 wt % to about 1 wt % mixed metal oxide compounds, (ii) about 1 wt % to about 99 wt % hydrotalcite like compounds, (iii) one or more metallic oxidants, and (iv) a support to the catalytic cracking feedstock. The mixed metal oxide compound can be a magnesium aluminate compound or can be in the form of a solid solution. In one embodiment, the mixed metal oxide is a precursor to a hydrotalcite like compound. In addition, the shaped bodies can be dried, calcined or a mixture thereof.

The gasoline sulfur reduction additives of the invention can comprise one or more metallic oxidants in an amount of about 0.01% by weight or more; about 0.1% by weight or more; about 1% by weight or more; about 5% by weight or more; about 10% by weight or more; about 15% by weight or more; about 20% by weight or more; about 25% by weight or more; or about 30% by weight or more, calculated as the oxide equivalent. In other embodiments, the metal in the metallic oxidant can be present in an amount of about 0.1% by weight to about 75% by weight; from about 1% by weight to about 50% by weight; from about 1% by weight to about 40% by weight; or from about 1% by weight to about 30% by weight, calculated as the oxide equivalent. In other embodiments, the metal in the metallic oxidant can be present in an amount of at least 15% by weight to about 50% by weight; from at least 15% by weight to about 40% by weight; or from about 20% by weight to about 30% by weight, calculated as the oxide equivalent.

The metals in the metallic oxidant may be used in their metallic form (e.g., metallic platinum) and/or in chemically compounded forms (e.g., in the form of their oxides). When the metals are used to make the additive of the invention, they may be in various salt forms, e.g., oxides, nitrates, acetates, and carbonates. For example, cerium can be used as a starting material in the reactions leading to the additives of the invention in the form of ceria, cerium acetate, cerium nitrate and/or cerium carbonate. Similarly, vanadium can be used as a starting material in the reactions leading to the additives of the invention in the form of vanadium oxide, and/or the decomposition products of various vanadium salts such as those of ammonium vanadate or vanadium oxalate.

The calcination step of the processes used to make the additives of the invention can also serve to convert any non-oxide ingredients (e.g., cerium acetate, cerium nitrate, cerium carbonate) used as a starting material into their oxide forms (e.g., cerium acetate, cerium nitrate, cerium carbonate will be converted to cerium oxide upon calcination). The metals in the metallic oxidants of the invention can be associated with the support by placing them in the reaction mixture along with the support ingredients; or they may be made by impregnating solutions containing ions of these metals into a dried form of materials forming the support.

One skilled in the art can make the compounds and compositions of the invention following the processes described herein and in U.S. Pat. No. 6,028,023, for example, the disclosure of which is incorporated by reference herein in its entirety.

The gasoline sulfur reduction additives of the invention can be in the form of shaped bodies (e.g., particles, grains, pellets, powders, extrudate, spheres, granules, other shapes, or mixtures of two or more thereof). The gasoline sulfur reduction additives can be dried materials, calcined materials, hydrated materials, or mixtures of two or more thereof.

The gasoline sulfur reduction additives of the invention generally have an attrition of about 4 or less; about 3 or less; about 2.5 or less; about 2.4 or less; about 2.3 or less; about 2.2 or less; about 2.1 or less; about 2 or less; about 1.9 or less; about 1.8 or less; about 1.7 or less; about 1.6 or less; or about 1.5 or less. In other embodiments, the attrition of the gasoline sulfur reduction additives can be about 1.4 or less; about 1.3 or less; about 1.2 or less; about 1.1 or less; or about 1.0 or less. The attrition is measured by the ASTM D5757 method between the first and second hours or between the first and fifth hours.

The gasoline sulfur reduction additives of the invention can be added to any conventional reactor-regenerator systems, to ebullating catalyst bed systems, to systems which involve continuously conveying or circulating catalysts/additives between reaction zone and regeneration zone and the like. Circulating bed systems are preferred. Typical of the circulating bed systems are the conventional moving bed and fluidized bed reactor-regenerator systems. Both of these circulating bed systems are conventionally used in hydrocarbon conversion (e.g., hydrocarbon cracking) operations with the fluidized catalyst bed reactor-regenerator systems being preferred.

To reduce the sulfur from gasoline, the additives herein are introduced into the regenerator and/or reactor of the FCC unit and are continuously cycled between the FCC reactor and the regenerator. The gasoline sulfur reduction additives can be used in an amount of at least 1 ppm; at least 2 ppm; or at least 5 ppm; in an amount of at least about 5% of the inventory of the regenerator; or in an amount of at least about 10% of the inventory of the regenerator.

EXAMPLES

The following examples are for purposes of illustration only and are not intended to limit the scope of the appended claims.

Example 1

Additives A-D were prepared and mixed at a concentration of 20 weight percent with a low metals equilibrium catalyst obtained from a commercial FCC unit. The resulting mixture was then run on a commercial laboratory FCC simulation reactor (Kayser Technologies, Inc, Model ACE R+). The resulting liquid product was analyzed on a Agilent 6890 gas chromatograph coupled to a HP/Agilent Atomic Emission Detector for quantification of sulfur species. The sulfur content measured was normalized to the total yield of gasoline measured on an Agilent 6890 SIMDIS (manufactured by from Agilent and Separation Systems Inc.). The results of the sulfur reduction analysis and obtained from the Agilent 6890 SIMDIS system are shown in Table 1 below. The percent gasoline sulfur reduction was calculated by comparing the results obtained for each additive composition to a base equilibrium catalyst sample containing no gasoline sulfur additive. In order to minimize the effects of dilution, the base-case equilibrium catalyst sample contained 20% of clay-based microspheres which possessed minimal activity. This base-case sample is shown as Additive E in Table 1.

TABLE 1

Gasoline Sulfur Reduction

| Additive | Gasoline (wt %) | Normalized Sulfur in Gasoline (ng/µl) | Normalized Gasoline Sulfur Reduction (%) |
| --- | --- | --- | --- |
| A | 56.5 | 472.0 | 8.1 |
| B | 58.3 | 464.2 | 9.6 |
| C | 59.1 | 470.5 | 8.3 |
| D | 57.9 | 477.3 | 7.0 |
| E (no additive) | 51.8 | 513.4 | 0.0 |

The sulfur reduction additives as set forth in Tables 1-3 are described below:

Additive A

Additive A is SUPER SOXGETTER® (commercially available from Intercat, Inc.) which is a collapsed hydrotalcite-like compound containing cerium and vanadium as the metallic oxidants and having a magnesium to aluminum ratio of about 4:1. The approximate quantity of cerium and vanadium, represented by its oxide equivalent is 15% $CeO_2$ and 4% $V_2O_5$. The composition was prepared as disclosed in U.S. Pat. No. 6,028,023, using a pseudoboehmite alumina and relatively high surface area magnesium oxide.

Additive B

Additive B was prepared by the method described in co-pending patent application U.S. Ser. No. 60/527,258 and in U.S. Pat. No. 6,028,023, the contents of which are incorporated by reference herein in their entireties, and is a magnesium aluminum mixed metal oxide composition prepared at an atomic ratio of magnesium to aluminum of 4.0. It was prepared using magnesium oxide (Premier Chemical) and pseudoboehmite alumina (Sasol). On a loss free basis, the relative proportions of $Al_2O_3$ and MgO were 24 and 76 weight percent, respectively. Following preparation, the composition was formed into microspheres with a particle size range of about 20 microns to about 200 microns by a spray drying technique. The resulting dried product was calcined at 600° C. for one hour.

Additive C

Additive C was prepared by a process similar to that of Additive A, except that Additive C contained no metallic oxidants. On a loss free basis, the relative proportions of $Al_2O_3$ and MgO were 24 and 76 weight percent, respectively. Following slurry preparation, the composition was formed into microspheres with a particle size range of about 20 microns to about 200 microns by a spray drying technique. The resulting dried product was calcined at 600° C. for one hour. Immediately following calcination, the product was fully hydrated using water as the medium. The hydrated product was then collapsed at 600° C. for one hour.

Additive D

Additive D was prepared by a process similar to that of Additive B, except that 10% tungsten oxide was added during the slurry preparation step. On a loss free basis, the relative proportions of $Al_2O_3$, MgO and $WO_3$ were 21.6, 68.4 and 10.0 weight percent, respectively.

As can be seen from the results in Table 1, the hydrotalcite-like and the mixed metal oxide compounds of the invention reduced the concentration of sulfur in the gasoline.

Example 2

Additives A-D were prepared and mixed at a concentration of ten weight percent with a low metals equilibrium catalyst obtained from a commercial FCC unit and run on a commercial laboratory FCC simulation reactor (Kayser Technologies, Inc, Model ACE R+) as described in Example 1 above. The total weight of catalyst or catalyst and additive was about nine grams. The ratio of catalyst or catalyst and additive to feedstock oil was about seven. The reactor temperature was maintained at about 990° F. The resulting gaseous and liquid products were analyzed. The results of this analysis are shown in Tables 2 and 3 below. The hydrotalcite-like and the mixed metal oxide compounds of the invention: reduced bottoms, the liquid product isolated above about 650° F.; increased catalytic conversion, partly due to the decrease in bottoms; increased gaseous product yields as defined by liquefied petroleum gas; increased the overall quantity of gasoline produced; and decreased the amount of light cycle oil isolated between about 430° F. and about 650° F. The yield shift summaries in Table 3 were calculated by comparing the results obtained for each additive composition to a base equilibrium catalyst sample containing no additive. In order to minimize the effects of dilution, the base-case equilibrium catalyst sample contained 20% of clay-based microspheres which possessed minimal activity. This base-case sample is shown as Additive E in Tables 2 and 3.

TABLE 2

Product Yields with Additives

|  |  | Additive | | | | |
| --- | --- | --- | --- | --- | --- | --- |
|  |  | A | B | C | D | E (no additive) |
| Conversion, w % | | 74.7 | 75.9 | 75.0 | 75.4 | 70.4 |
| Coke | | 8.2 | 6.3 | 6.0 | 6.1 | 5.6 |
| $C_2$ | | 2.7 | 2.8 | 2.6 | 2.7 | 2.5 |
| Total | $C_3$ | 6.6 | 7.1 | 6.8 | 7.0 | 6.4 |
|  | $C_3$ | 1.6 | 1.8 | 1.7 | 1.7 | 1.6 |
|  | $C_3=$ | 5.0 | 5.3 | 5.1 | 5.3 | 4.8 |
| Total | $C_4$ | 11.8 | 12.8 | 12.4 | 12.7 | 11.7 |
|  | $iC_4$ | 5.0 | 5.6 | 5.4 | 5.4 | 4.9 |
|  | $nC_4$ | 1.3 | 1.5 | 1.5 | 1.5 | 1.3 |
| Total | Butene | 5.5 | 5.8 | 5.5 | 5.8 | 5.5 |
|  | $iC_4=$ | 1.3 | 1.4 | 1.3 | 1.4 | 1.3 |
|  | $nC_4=$ | 4.1 | 4.4 | 4.2 | 4.5 | 4.1 |
| Liquid Petroleum Gas (LPG) | | 18.5 | 19.9 | 19.2 | 19.7 | 18.1 |
| Gasoline | | 45.3 | 46.9 | 47.2 | 46.8 | 44.2 |
| Light Cycle Oil (LCO) | | 15.3 | 14.8 | 15.0 | 15.2 | 15.9 |
| Bottoms | | 10.0 | 9.3 | 10.0 | 9.4 | 13.7 |
| Total | | 100.0 | 100.0 | 100.0 | 100.0 | 100.0 |

TABLE 3

Yield Shift Summary

|  | Additive | | | | |
| --- | --- | --- | --- | --- | --- |
|  | A | B | C | D | E (no additive) |
| dLPG | 0.4 | 1.9 | 1.1 | 1.7 | 0.0 |
| dGasoline | 1.1 | 2.7 | 3.0 | 2.6 | 0.0 |
| dLCO | −0.7 | −1.2 | −1.0 | −0.7 | 0.0 |
| dBottoms | −3.7 | −4.4 | −3.7 | −4.3 | 0.0 |
| dConversion | 4.4 | 5.6 | 4.6 | 5.0 | 0.0 |
| dCoke | 2.6 | 0.6 | 0.4 | 0.5 | 0.0 |

All patent applications, published patent applications, issued and granted patents, texts, and literature references cited in this specification are hereby incorporated herein by reference in their entirety to more fully describe the state of the art to which the present invention pertains.

Various modifications of the invention, in addition to those described herein, will be apparent to one skilled in the art from the foregoing description. Such modifications are intended to fall within the scope of the appended claims.

What is claimed is:

1. A method of reducing the concentration of sulfur in gasoline produced in an FCC unit comprising contacting a catalytic cracking feedstock with an effective amount of one or more mixed metal oxide compounds prepared by a process comprising:
(a) reacting an aqueous mixture comprising at least one divalent metal compound and at least one trivalent metal compound to produce a mixed metal oxide compound in the form of an aqueous slurry;
(b) optionally heat treating the mixed metal oxide compound from step (a) at a temperature up to about 225°

C. to produce a heat-treated mixed metal oxide compound in the form of an aqueous slurry;

(c) drying the heat-treated compound from step (b) to produce one or more shaped bodies of the mixed metal oxide compound suitable for use in the reduction of sulfur from gasoline; wherein the one or more mixed metal oxide compounds has an X-ray diffraction pattern displaying at least a reflection at a two theta peak position at about 43 degrees and about 62 degrees and (d) optionally heat treating the shaped bodies from step (c) at a temperature of about 300° C. or higher to produce one or more calcined shaped bodies of a mixed metal oxide compound.

2. The method according to claim 1, wherein the divalent metal cation in the divalent metal compound of step (a) is selected from $Mg^{2+}$, $Ca^{2+}$, $Zn^{2+}$, $Mn^{2+}$, $Co^{2+}$, $Ni^{2+}$, $Sr^{2+}$, $Ba^{2+}$, $Cu^{2+}$ or a mixture of two or more thereof.

3. The method according to claim 1, wherein the trivalent metal cation in the trivalent metal compound of step (a) is selected from $Al^{3+}$, $Mn^{3+}$, $Fe^{3+}$, $Co^{3+}$, $Ni^{3+}$, $Cr^{3+}$, $Ga^{3+}$, $B^{3+}$, $La^{3+}$, $Gl^{3+}$, $Ce^{3+}$, or a mixture of two or more thereof.

4. The method according to claim 1, wherein the divalent metal compound of step (a) is selected from magnesium oxide, magnesium hydroxy acetate, magnesium acetate, magnesium hydroxide, magnesium nitrate, magnesium hydroxide, magnesium carbonate, magnesium formate, magnesium chloride, magnesium aluminate, hydrous magnesium silicate, magnesium calcium silicate, or a mixture of two or more thereof.

5. The method according to claim 1, wherein the trivalent metal compound of step (a) is selected from aluminum hydroxide hydrate, aluminum oxide, aluminum acetate, aluminum nitrate, aluminum hydroxide, aluminum carbonate, aluminum formate, aluminum chloride, hydrous aluminum silicate, aluminum calcium silicate, or a mixture of two or more thereof.

6. The method according to claim 1, wherein, in step (a), in the mixed metal oxide compounds, the ratio of the divalent metal cation to the trivalent metal cation is selected from about 1:1 to about 10:1; from about 1:1 to about 6:1; from about 1.5:1 to about 6:1; or from about 2:1 to about 5:1.

7. The method according to claim 1, further comprising a support comprising a spinel, magnesia, magnesium acetate, magnesium nitrate, magnesium chloride, magnesium hydroxide, magnesium carbonate, magnesium formate, magnesium aluminate, hydrous magnesium silicate, magnesium silicate, magnesium calcium silicate, aluminum silicate, calcium silicate, alumina, aluminum titanate, zinc titanate, aluminum zirconate, calcium oxide, calcium aluminate, aluminum nitrohydrate, an aluminum hydroxide compounds, an aluminum-containing metal oxide compound other than alumina or an aluminum hydroxide compound, aluminum chlorohydrate, silica, silicon-containing compound other than silica, silica/alumina, titania, zirconia, clay, clay phosphate material, zeolite, or a mixture of two or more thereof.

8. The method according to claim 1, wherein the mixed metal oxide compounds comprise an amount selected from at least about 1 ppm, at least about 2 ppm, or at least about 5 ppm.

9. The method according to claim 1 wherein the mixed metal oxide compounds comprises about 5% or more of the inventory of the regenerator.

10. The method according to claim 1, wherein the mixed metal oxide compounds comprises about 10% or more of the inventory of the regenerator.

11. A method of reducing the concentration of sulfur in gasoline produced in an FCC unit comprising contacting a catalytic cracking feedstock with an effective amount of at least one mixed metal oxide compound comprising magnesium and aluminum in a ratio of about 1:1 to about 10:1 and having an x-ray diffraction pattern displaying at least a reflection at a two theta peak position at about 43 degrees and about 62 degrees.

12. The method according to claim 11, wherein the ratio of magnesium to aluminum is about 1:1 to about 6:1.

13. The method according to claim 11, wherein the ratio of magnesium to aluminum is about 1.8:1 to about 5:1.

14. The method according to claim 11, wherein the ratio of magnesium to aluminum is about 2:1 to about 4:1.

15. The method of claim 11, wherein the compound is a shaped body.

16. The method of claim 15, wherein the shaped body is a dried shaped body.

17. The method of claim 15, wherein the shaped body is a calcined shaped body.

18. The method of claim 11, wherein the compound comprises magnesium in an amount of about 40% or more by weight, calculated as the oxide equivalent.

19. The method of claim 11, wherein the compound further comprises at least one metallic oxidant.

20. The method of claim 19, wherein the metal in the metallic oxidant is selected from antimony, bismuth, cadmium, cenum, chromium, cobalt, copper, dysoprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof.

21. The method of claim 11, wherein the compound further comprises a support.

22. The method of claim 21, wherein the support comprises a spinel, hydrotalcite like compound, magnesium acetate, magnesium nitrate, magnesium chloride, magnesium hydroxide, magnesium carbonate, magnesium formate, aluminum titanate, zinc titanate, aluminum zirconate, calcium oxide, calcium aluminate, aluminum nitrohydrate, aluminum hydroxide compound, aluminum-containing metal oxide compound, aluminum chlorohydrate, titania, zirconia, clay, clay phosphate material, zeolite, or a mixture of two or more thereof.

23. The method of claim 21, wherein the support is selected from zinc titanate, zinc aluminate, or zinc titanate/zinc aluminate.

24. The method according to claim 11, wherein the at least one mixed metal oxide compound comprises an amount selected from at least about 1 ppm, at least about 2 ppm, or at least about 5 ppm.

25. The method according to claim 11 wherein the at least one mixed metal oxide compound comprises about 5% or more of the inventory of the regenerator.

26. The method according to claim 11, wherein the at least one mixed metal oxide compound comprises about 10% or more of the inventory of the regenerator.

27. A method for reducing the concentration of sulfur in gasoline produced in an FCC unit comprising contacting a catalytic cracking feedstock with (i) an effective amount of shaped bodies comprising a mixed metal oxide solid solution comprising magnesium and aluminum in a ratio of about 1:1 to about 10:1 and having an X-ray diffraction pattern displaying at least a reflection at a two theta peak position at about 43 degrees and about 62 degrees, (ii) a support comprising a spinel, magnesia, magnesium acetate, magnesium nitrate, magnesium chloride, magnesium hydroxide, magnesium carbonate, magnesium formate, magnesium aluminate, hydrous magnesium silicate, magnesium silicate, magnesium calcium silicate, aluminum silicate, calcium silicate, alumina, aluminum titanate, zinc titanate, aluminum zirconate, calcium oxide, calcium aluminate, aluminum nitrohydrate, an aluminum hydroxide compounds, an aluminum-containing metal oxide compound other than alumina or an aluminum hydroxide compound, aluminum chlorohydrate, silica, silicon-containing compound other than silica, silica/alumina, titania, zirconia, clay, clay phosphate material, zeolite, or a mixture of two or more thereof; and (iii) at least one metallic oxidant selected from antimony, bismuth, cadmium, cerium, chromium, cobalt, copper, dysoprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof.

28. The method according to claim 27, further comprising a hydrotalcite like compound.

29. The method according to claim 28, wherein the hydrotalcite like compound is a calcined hydrotalcite like compound.

30. The method according to claim 28, wherein the hydrotalcite like compound is a collapsed hydrotalcite like compound.

31. A method for reducing gasoline sulfur comprising contacting a catalytic cracking feedstock with (i) a mixed metal oxide compound comprising magnesium and aluminum and having an X-ray diffraction pattern displaying at least a reflection at a two theta peak position at about 43 degrees and about 62 degrees, wherein the ratio of magnesium to aluminum in the compound is from about 1:1 to about 10:1, and (ii) about 1 wt % to about 75 wt % of a hydrotalcite like compound.

32. The method of claim 31, where the compound is heated prior to contacting the compound with the feedstock.

33. The method of claim 31, wherein the ratio of magnesium to aluminum is about 1.8:1 to about 5:1.

34. The method of claim 31, wherein the ratio of magnesium to aluminum is about 1:1 to about 5:1.

35. The method of claim 31, wherein the ratio of magnesium to aluminum is about 2:1 to about 4:1.

36. The method of claim 31, wherein the compound is a shaped body.

37. The method of claim 36, wherein the shaped body is a dried shaped body.

38. The method of claim 36, wherein the shaped body is a calcined shaped body.

39. The method of claim 31, wherein the compound comprises magnesium in an amount of about 40% or more by weight, calculated as the oxide equivalent.

40. The method of claim 31, wherein the compound comprises (i) about 99 wt % to about 50 wt % of a compound comprising magnesium and aluminum and having an X-ray diffraction pattern displaying at least a reflection at a two theta peak position at about 43 degrees and about 62 degrees, wherein the ratio of magnesium to aluminum in the compound is from about 1:1 to about 6:1, and (ii) about 1 wt % to about 50 wt % of a hydrotalcite like compound.

41. The method according to claim 40, wherein the compound comprises (i) about 99 wt % to about 75 wt % of a compound comprising magnesium and aluminum and having an X-ray diffraction pattern displaying at least a reflection at a two theta peak position at about 43 degrees and about 62 degrees, wherein the ratio of magnesium to aluminum in the compound is from about 1:1 to about 6:1, and (ii) about 1 wt % to about 25 wt % of a hydrotalcite like compound.

42. The method according to claim 41, wherein the compound comprises (i) about 95 wt % to about 75 wt % of a compound comprising magnesium and aluminum and having an X-ray diffraction pattern displaying at least a reflection at a two theta peak position at about 43 degrees and about 62 degrees, wherein the ratio of magnesium to aluminum in the compound is from about 1:1 to about 6:1, and (ii) about 5 wt % to about 25 wt % of a hydrotalcite like compound.

43. The method according to claim 31, wherein the compound further comprises at least one metallic oxidant.

44. The method according to claim 43, wherein the metal in the metallic oxidant is antimony, bismuth, cadmium, cerium, chromium, cobalt, copper, dysoprosium, erbium, europium, gadolinium, germanium, gold, holmium, iridium, iron, lanthanum, lead, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof.

45. The method according to claim 31, wherein the compound further comprises a support.

46. The method according to claim 45, wherein the support comprises a spinel, hydrotalcite like compound, magnesium acetate, magnesium nitrate, magnesium chloride, magnesium hydroxide, magnesium carbonate, magnesium formate, aluminum titanate, zinc titanate, aluminum zirconate, calcium oxide, calcium aluminate, aluminum nitrohydrate, aluminum hydroxide compound, aluminum-containing metal oxide compound, aluminum chlorohydrate, titania, zirconia, clay, clay phosphate material, zeolite, or a mixture of two or more thereof.

47. The method according to claim 46, wherein the support comprises zinc titanate, zinc aluminate, or zinc titanate/zinc aluminate.

* * * * *

UNITED STATES PATENT AND TRADEMARK OFFICE
CERTIFICATE OF CORRECTION

PATENT NO.       : 7,347,929 B2
APPLICATION NO.  : 10/749695
DATED            : March 25, 2008
INVENTOR(S)      : Vierheilig et al.

It is certified that error appears in the above-identified patent and that said Letters Patent is hereby corrected as shown below:

Column 1, line 6, delete "Jun. 5, 2005" and insert instead --Jun. 9, 2005--.

Column 2, lines 59 and 64, delete "C." and insert instead --C--.

Column 8, lines 39 and 47, delete "C." and insert instead --C--.

Column 9, lines 47-51, delete "C." and insert instead --C--.

Column 10, lines 19-24, delete "C." and insert instead --C--.

Column 18, lines 9-30 (approx), delete Table 2 and insert instead:

Table 2. Product Yields with Additives

|  | Additive | | | | |
| --- | --- | --- | --- | --- | --- |
|  | A | B | C | D | E (no additive) |
| Conversion, w% | 74.7 | 75.9 | 75.0 | 75.4 | 70.4 |
| Coke | 8.2 | 6.3 | 6.0 | 6.1 | 5.6 |
| $C_2$ | 2.7 | 2.8 | 2.6 | 2.7 | 2.5 |
| Total $C_3$ | 6.6 | 7.1 | 6.8 | 7.0 | 6.4 |
| C3 | 1.6 | 1.8 | 1.7 | 1.7 | 1.6 |
| $C_3^=$ | 5.0 | 5.3 | 5.1 | 5.3 | 4.8 |
| Total $C_4$ | 11.8 | 12.8 | 12.4 | 12.7 | 11.7 |
| $iC_4$ | 5.0 | 5.6 | 5.4 | 5.4 | 4.9 |
| $nC_4$ | 1.3 | 1.5 | 1.5 | 1.5 | 1.3 |
| Total Butene | 5.5 | 5.8 | 5.5 | 5.8 | 5.5 |
| $iC_4^=$ | 1.3 | 1.4 | 1.3 | 1.4 | 1.3 |
| $nC_4^=$ | 4.1 | 4.4 | 4.2 | 4.5 | 4.1 |
| Liquid Petroleum Gas (LPG) | 18.5 | 19.9 | 19.2 | 19.7 | 18.1 |
| Gasoline | 45.3 | 46.9 | 47.2 | 46.8 | 44.2 |
| Light Cycle Oil (LCO) | 15.3 | 14.8 | 15.0 | 15.2 | 15.9 |
| Bottoms | 10.0 | 9.3 | 10.0 | 9.4 | 13.7 |
| Total | 100.0 | 100.0 | 100.0 | 100.0 | 100.0 |

UNITED STATES PATENT AND TRADEMARK OFFICE
CERTIFICATE OF CORRECTION

PATENT NO. : 7,347,929 B2
APPLICATION NO. : 10/749695
DATED : March 25, 2008
INVENTOR(S) : Vierhelig et al.

It is certified that error appears in the above-identified patent and that said Letters Patent is hereby corrected as shown below:

Column 19, lines 1 and 11, in claim 1, delete "C." and insert instead --C--.

Column 20, line 28, in claim 20, "cenum" and insert instead --cerium--.

Column 21, line 54, in claim 35, delete "about4:1" and insert instead --about 4:1--.

Signed and Sealed this

First Day of July, 2008

JON W. DUDAS
*Director of the United States Patent and Trademark Office*